United States Patent [19]

Thomas

[11] Patent Number: 4,818,032
[45] Date of Patent: Apr. 4, 1989

[54] ANTI-THEFT LOCKING DEVICE

[76] Inventor: John V. Thomas, 665 Park Dr., Barrington, Ill. 60010

[21] Appl. No.: 96,050

[22] Filed: Sep. 14, 1987

[51] Int. Cl.⁴ ............................ B60B 7/06; B60B 3/02
[52] U.S. Cl. ........................ 301/37 AT; 301/37 CM; 301/108 R; 70/259
[58] Field of Search ............ 301/37 R, 37 P, 37 CM, 301/37 C, 37 CD, , 37 S, 108 R, 108 A, 108 S, 108 TW, 37 AT, 37 SC, 108 SC; 70/259, 260

[56] References Cited

U.S. PATENT DOCUMENTS

| | | | |
|---|---|---|---|
| 2,124,789 | 7/1938 | Lyon | 301/108 R X |
| 2,159,881 | 5/1939 | Booth | 301/37 SC |
| 3,078,124 | 2/1963 | Mulder | 301/37 SC |
| 3,336,771 | 8/1967 | Selleck | 70/259 |
| 4,067,621 | 1/1978 | Reppert | 301/37 AT X |
| 4,138,160 | 2/1979 | Lohmeyer | 301/108 S |
| 4,217,002 | 8/1980 | Simpson | 301/37 CM |
| 4,447,091 | 5/1984 | Nguyen et al. | 301/37 AT |
| 4,460,219 | 7/1984 | Sepanik | 301/37 CM X |
| 4,462,639 | 7/1984 | Holmstrom | 301/108 SC X |
| 4,544,209 | 10/1985 | Braungart | 301/37 AT |
| 4,591,211 | 5/1986 | Browning et al. | 301/9 G |

FOREIGN PATENT DOCUMENTS 3505145 8/1986 Fed. Rep. of Germany ........ 301/37 AT
942654 11/1963 United Kingdom ........... 301/37 SC Primary Examiner—Johnny D. Cherry
Assistant Examiner—Russell D. Stormer
Attorney, Agent, or Firm—Silverman, Cass, Singer & Winburn, Ltd.

[57] ABSTRACT

Anti-theft locking device for securing a wheel medallion to the wheel of a vehicle. The device is utilized with a conventional wheel medallion of the type having spring retainers that protrude from the body of the medallion and extend through an opening at the hub of the wheel. Further, the spring retainers have clips that are configured to pass through the opening and abut the surface of the wheel that is opposite to the body of the medallion. A medallion locking disk is provided that is larger than the opening and which will not pass through the opening. The disk has blades which, in the unlocked condition, fit within the confines of the spring retainers and extend between adjacent clips. In the locked condition, the blades are positioned within the clips to hold the clips in an outward position abutting the surface of the wheel. Thus, the clips are prevented from passing through the opening and the medallion is locked to the wheel.

16 Claims, 2 Drawing Sheets

ANTI-THEFT LOCKING DEVICE

BACKGROUND OF THE INVENTION

The invention relates generally to a locking device for a wheel medallion and more particularly to a simplified one-piece locking device for use with a conventional wheel medallion.

Some automobiles are provided with expensive decorative wheel covers, or caps, formed separately from the wheel itself. The cap can be dimensioned large enough to cover the entire wheel. In that case, the cover must be removed before the lug nuts can be loosened and the tire removed from the vehicle. On the other hand, the medallion can be dimensioned to cover only the hub of the wheel leaving the lug nuts exposed and making it unnecessary to remove the cover every time it is desired to remove the tire from the vehicle. This smaller cap is often referred to as a wheel medallion because it generally includes an insignia such as a trademark or an ornamental logo identifying the manufacturer of the vehicle.

Wheel medallions are subject to loss and, because they are small, accessible and valuable, wheel medallions are the subject of theft. Consequently, many prior art attempts have been made to lock the medallion to the wheel of the vehicle. These prior art attempts require a specially manufactured cap. They do not allow for the use of conventionally manufactured medallions which are the ones recognized as valuable. An example of a prior art attempt to provide an anti-theft hub cap would be to specially manufacture a pair of nested cups threaded together through the wheel hub wherein the outer cup can function as a cap covering the hub of the wheel. Another example would be a sleeve or housing that is bolted to the axle hub of the vehicle. A separate piece, a specially manufactured cap, has a key lock customized into the exterior surface of the medallion. The exterior lock is used to lock the medallion to the wheel from the face or front surface of the wheel. This type of lock is still susceptible to theft because it is accessible. Other attempts utilize an existing medallion but involve screw, bolt or lock arrangements drilled into the medallion. These arrangements are unsatisfactory because they deface the medallion and result in a reduction in its value.

In general, it would be advantageous to provide an anti-theft locking device that can be used with a conventional medallion and particularly one that will not deface the medallion.

SUMMARY OF THE INVENTION

The disadvantages of the prior art locking devices are overcome in accordance with the present invention by providing a wheel medallion locking device that is utilized with a conventional wheel medallion. The medallion is of the type that is held in place on the wheel by spring retainers that extend through an opening at the hub of a wheel and terminate with clips that abut a surface of the wheel opposite to the medallion body.

The medallion locking device of the present invention is dimensioned larger than the opening and small enough to fit within the confines of the spring retainers as they protrude from the opening. Further, the locking device is provided with blades that, in the unlocked condition extend between adjacent clips to allow the disk to be inserted into or removed from the retainers. In the locked condition, the blades are rotated such that the rim of the blades can hold the clips in an outward position abutting the surface of the wheel. In this manner, the clips are prevented from passing through the opening and the medallion is locked to the wheel.

The locking device is located on the side of the wheel that faces the axle of the vehicle and, therefore, the wheel must be removed from the vehicle to insert or to remove the medallion device.

DESCRIPTION OF THE PREFERRED EMBODIMENT

Figure 1:
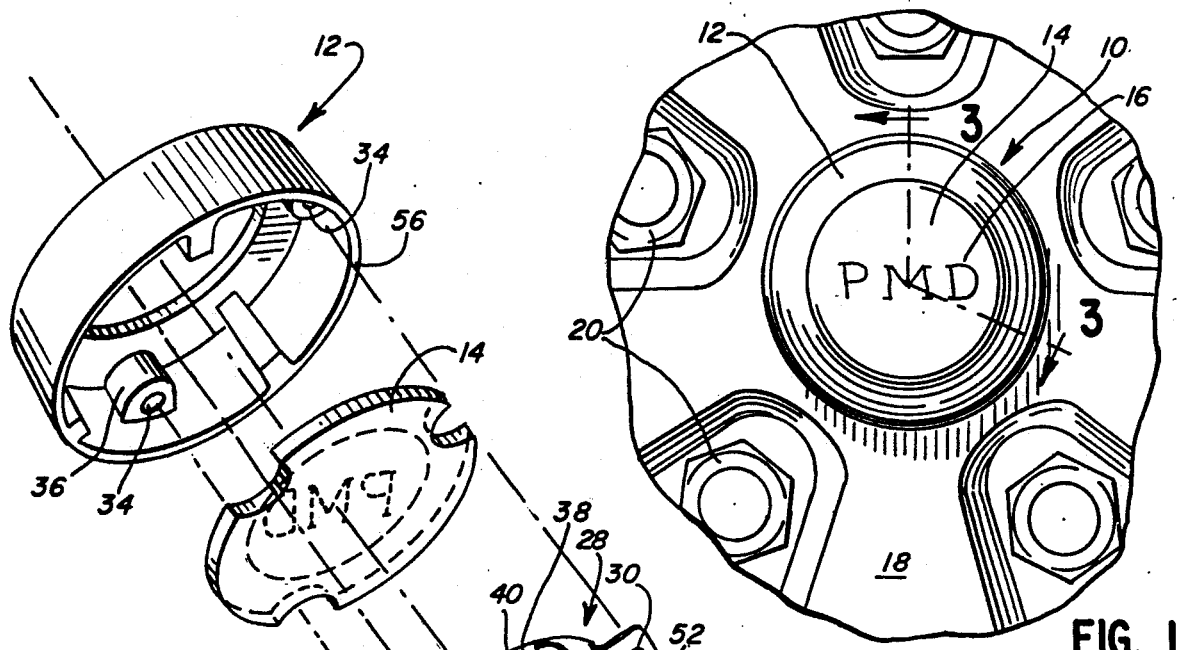
FIG. 1 is a fragmentary plan view of a wheel of a vehicle with a wheel medallion secured thereto.

Referring to FIG. 1, a conventional wheel medallion is designated generally by the reference numeral 10. The medallion 10 has a body 12 into which a plate 14 is secured. The plate 14 contains an insignia 16, such as a trademark or logo. The insignia 16 generally identifies the manufacture of a vehicle (not shown). In this case, PMD represents Pontiac Motor Division. The body and the plate are generally assembled as one piece from the separate pieces, however, the plate could be interchanged and a different plate could be substituted to identify a different manufacturer, for example, Cadillac. Additionally, the invention does not require a two-piece medallion and a one-piece medallion is also contemplated.

Figure 2:
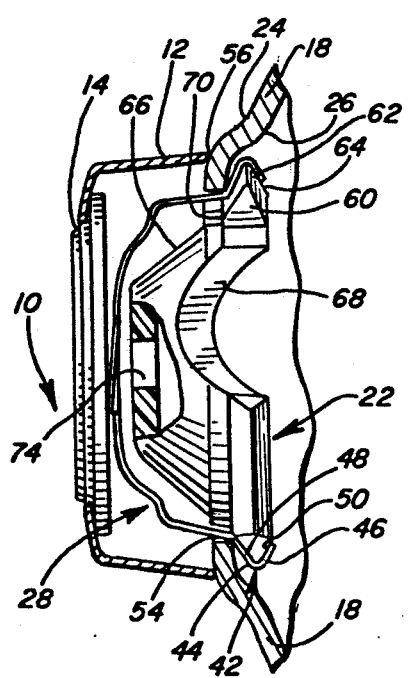
FIG. 2 is an exploded perspective of a wheel medallion illustrating the locking device of the present invention.

The medallion 10 is located over an opening 17 in the hub of a wheel 18 (best seen in FIG. 2). The wheel 18 is a conventional wheel generally associated with a vehicle. The medallion 10 is sized such that lug nuts 20 are accessible when the medallion 10 is attached to the wheel 18. Therefore, the wheel 18 can be removed from the vehicle without having to first remove the medallion 10 from the wheel 18.

Referring now to FIG. 2, the medallion 10 is illustrated in an exploded view. A locking device of the present invention is designated generally by the reference numeral 22. The medallion body 12 is illustrated on a face or front surface 24 of the wheel 18 and the locking device 22 is illustrated on the back or rear surface 26. The back surface 26 is the surface of the wheel that faces the axle (not shown) when the wheel is installed on the vehicle. In other words, when the locking device 22 is installed and the wheel 18 is bolted to the vehicle, the locking device 22 is inaccessible. A thief cannot remove the wheel medallion from the wheel unless he first removes the wheel from the vehicle. The time and effort required to remove the wheel from the vehicle will deter all but the most determined thief.

A medallion retainer is designated generally by the reference numeral 28. The retainer 28 is secured to the medallion body 12 by screws or bolts (not shown) that pass through openings 30 in brackets 32 of the retainer 28. The openings 30 cooperate with openings 34 located on ribs 36 of the medallion body 12. When the medallion 10 is assembled, the medallion plate 14 is securely held between the medallion body 12 and the retainer 28.

Spring retainers 38 protrude from the retainer 28 and are crimped at an end 40 to provide a clip 42. The clip 42 forms exterior beveled surfaces 44 and 46 as well as interior beveled surfaces 48 and 50 (best seen in FIG. 3). Stabilizers 52 can be provided to prevent the medallion 10 from moving or vibrating within the opening 17. When the assembled medallion 10 is positioned on the wheel 18 the spring retainers 38 and the clips 42 will pass through the opening 17 at notches 54 in the wheel 18 that are supplied for that purpose. The surface 44 of the clip 42 abuts the back or rear surface 26 of the wheel 18 and prevents the clips 42 from passing through the opening 17. Thus the medallion body 12 is secured in place with a lower edge 56 adjacent the face or front surface 24 of the wheel 18. Although the disclosed embodiment illustrates the medallion 10 as having three spring retainers 38 and three stabilizers 52, the concept of the invention is to have the clips held in place by the locking device 22 and the invention is not restricted to a particular configuration of spring retainers or spring retainers in combination with stabilizers.

The medallion 10 is conventional and of the type generally supplied with the vehicle. Medallion dimensions, number of components, and material are not critical to the functioning of the present invention. The claimed invention requires only that the medallion be of the type having a plurality of protruding spring retainers supplied with clips that are configured to pass through the opening 17 in the wheel 18 and abut the back or rear surface 26 to hold the medallion body 12 in place on the wheel 18.

It can be seen that without a locking device this type of medallion can be easily stolen. The thief need only pull or pry the medallion from the wheel. Additionally, the medallion can be lost through vibration or jarring as, for example, when the vehicle is subjected to a rough road or pot holes.

Figure 3:
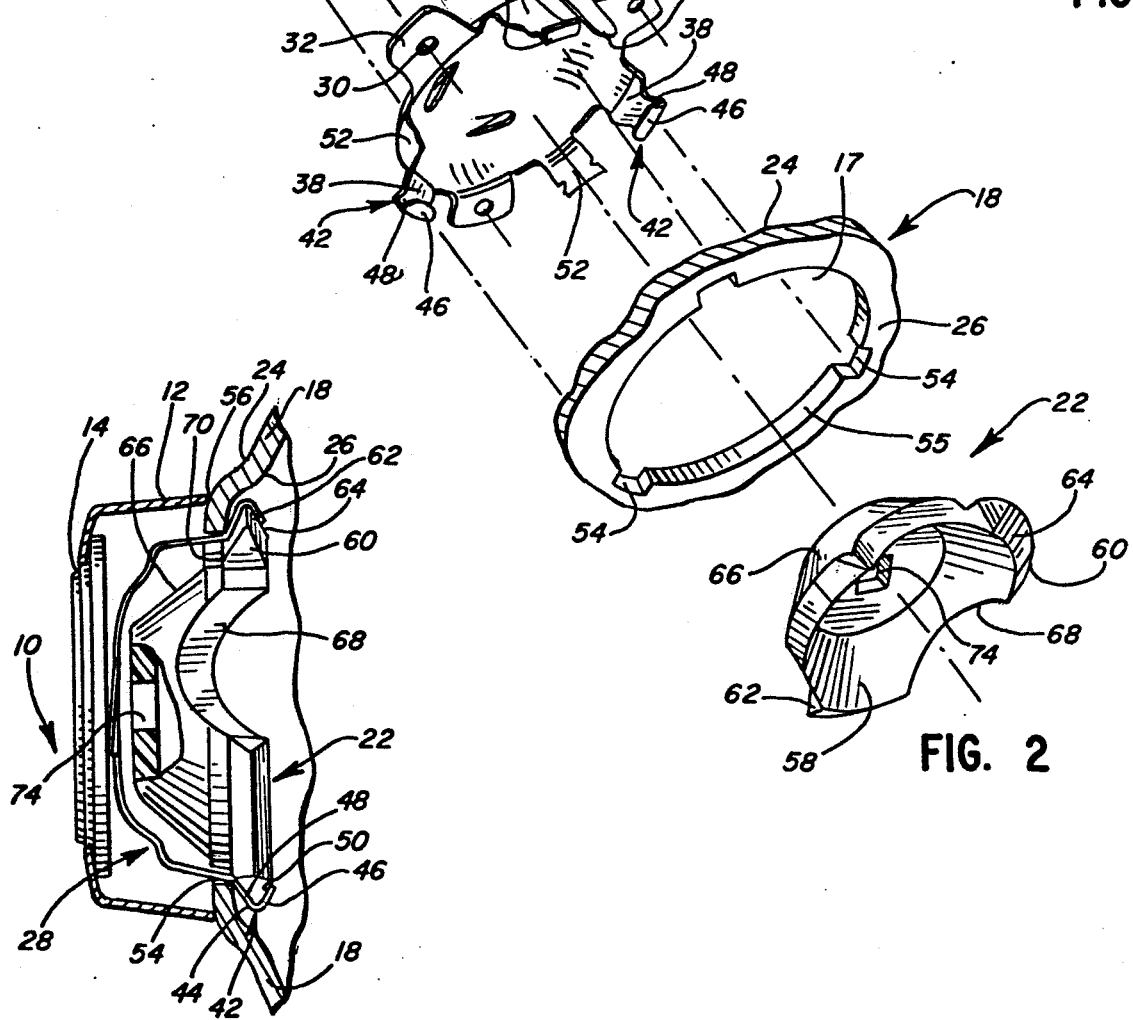
FIG. 3 is a side sectional view illustrating the present invention taken through the wheel medallion along the line 3—3 of FIG. 1 and in the direction indicated generally.

The locking device 22 of the present invention provides a simple to use, yet secure, lock to prevent the theft of the wheel medallion 10. Referring now to FIGS. 2 and 3, the locking device 22 has a plurality of blades 58 (best seen in FIGS. 4 and 5). The blades 58 have a beveled rim 60 with an upper beveled surface 62 and a lower beveled surface 64. The beveled surfaces 62 and 64 of the blades 58 are dimensioned to mate with the interior beveled surfaces 48 and 50 respectively of the clip 42 (best see in FIG. 3). The beveled rim 60 can be provided with an outwardly extending lock tab (not shown) to bind against the clip 42 to ensure that the device 22 is securely held in position within the clip 42.

The locking device 22 is further provided with inclined sides 66 rising from the rim 60 to a face 67. The inclined sides 66 allow the device 22 to project into the medallion body 12 through the opening 17 to provide space for a wheel grease cap (not shown), that is generally found on the front wheels of the vehicle, when the device 22 is positioned within the confines of the spring retainer 38. However, the inclined sides are not a necessary feature of the invention if the grease cap or another similar structure does not penetrate into the opening 17 and can be eliminated or reduced so long as the device 22 functions to lock the medallion 10 to the wheel 18 of the vehicle as described hereinafter.

Figure 4:
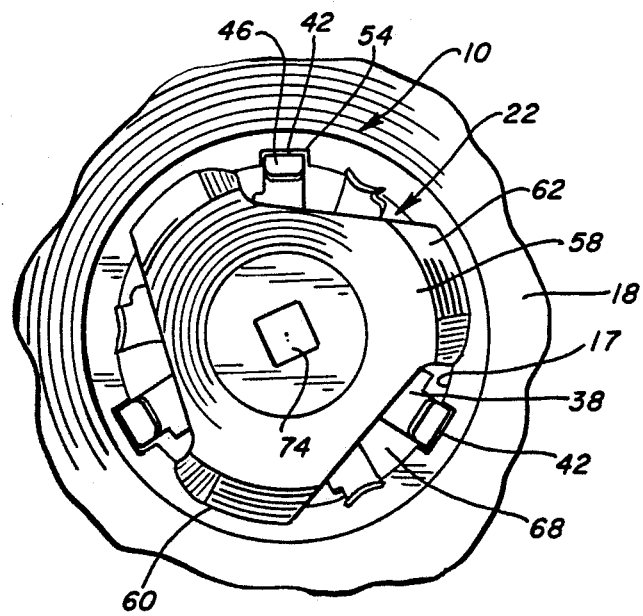
FIG. 4 is a fragmentary plan view of a wheel of a vehicle illustrating the position of the present invention within the medallion when the locking device is in the unlocked position.
Figure 5:
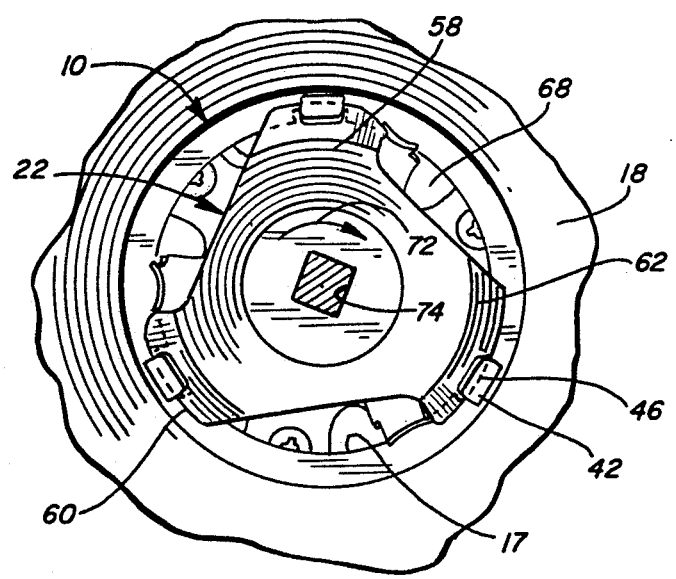
FIG. 5 is a fragmentary plan view of a wheel of a vehicle illustrating the position of the present invention within the medallion when the locking device is in the locked position.

Referring to FIGS. 4 and 5, spaces or notches 68 are supplied along the circumference of the device 22 so that the device 22 can be conveniently inserted or removed from the medallion 10. The device 22 is inserted with the blades 58 spaced between adjacent spring retainers 38. With this orientation, the notches 68 align with the clips 42 to avoid a conflict with the exterior beveled surface 46 of the clip 42 when the device 22 is inserted or removed. Three notches are illustrated in this example but more or less blades 58 and notches 68 are contemplated so long as they are configured to allow the device 22 to be inserted as herein described.

A shoulder 70 (best seen in FIG. 3) is provided between the inclined sides 66 and the beveled rim 60. The shoulder 70 abuts the back or rear surface 26 of the wheel 18 to firmly seat the locking device 22 in place and prevent the device 22 from passing through the opening 17.

The device 22 is installed with the wheel 18 removed from the vehicle. The medallion 10 is located in the opening 17 with the spring retainer 38 extending through the opening 17. The clips 42 can either remain adjacent the notches 54 or the medallion 10 can be rotated to align the insignia 16 with another insignia or feature found on the wheel 18. In either case, the medallion 10 is positioned on the face or front surface 24 of the wheel 18 and the locking device 22 is placed within the confines of the spring retainers 38 from the back or rear surface 26 of the wheel 18 such that the blades 58 are between adjacent clips 42. The spaces or notches 68 allow the device 22 to be inserted so that the shoulder 70 can seat against the wheel 18.

After the device 22 is inserted, it is rotated in the direction indicated by arrow 72, in FIG. 5, such that the beveled surfaces 62 and 64 of the rim 60 extend into the clip 42 and mate with the interior beveled surfaces thereof, 48 and 50 respectively. The rim 60 holds the clips 42 in their outward position to prevent the clips 42 from passing through the opening 17. Thus, the medallion 10 is securely locked in placed on the wheel 18.

An opening 74 and a mating tool (not shown) can be provided such that the mating tool, for example a drive ratchet extension, can be utilized to rotate the device 22. Use of such a tool will prevent scarring or other damage to the medallion 10 when the device 22 is rotated to either the locked or the unlocked condition. The opening 74 is not restricted to a specific dimension and a slot configuration in combination with a screwdriver, as a mating tool, is also possible. Alternatively, the device 22 can be provided with other rotating structures such as a nut. However, the rotating structure must be able to withstand the amount of torque necessary to secure the device 22 within the clips 42.

After the locking device 22 is installed and rotated to the locked condition, the wheel 18 is returned to the vehicle. Once installed the medallion 10 cannot be removed from the face or front surface 24 of the wheel 18. Consequently, the anti-theft locking device of the present invention provides a lock for wheel medallions that will prevent the loss of the expensive medallion while the wheel is attached to the vehicle.

Modification and variations of the present invention are possible in light of the above teachings. The invention is not restricted to a particular material, although a hard plastic material is preferred. Further, the wheel medallion is not restricted as to size or shape and can have the configuration of a wire wheel cover provided that the lug nuts are accessible with the medallion installed on the vehicle. Additionally, the number of spring retainers on the medallion can vary. For example, an Oldsmobile vehicle medallion generally has six spring retainers and no stabilizers. It is therefore to be understood that within the scope of the appended claims, the invention may be practiced otherwise than as specifically described.

What is claimed and desired to be secured by Letters Patent of the United States is:

1. A method of locking a wheel medallion to the wheel of a vehicle wherein the medallion is of the type having a plurality of protruding spring retainers supplied with clips that are configured to pass through an opening in the hub of the wheel and abut a surface of the wheel opposite to the medallion body such that the madallion is held in place on the wheel, said method comprising:
   providing a medallion locking disk having a dimension larger than the opening in the hub of the wheel;
   providing inner and outer engagement portions on said clips, said outer engagement portions abutting the surface of the wheel opposite to the medallion body;
   locating said locking disk on the surface of the wheel opposite to the medallion and within the confines of the clips; and
   positioning said locking disk within said inner engagement portion of said clips to hold the clips in an outward position abutting the surface of the wheel and to prevent the clips from passing through the opening so that the medallion is locked to the wheel.

2. The method as defined in claim 1 including providing blades on said locking disk so that said blades extend between adjacent retainers when said disk is in unlocked condition of inserting said disk into or removing said disk from the confines of said clips; and
   rotating said disk to locate said blades within the clips so that the clips are locked in an outward position abutting the surface of the wheel to prevent the clips from passing through the opening.

3. The method as defined in claim 2 wherein said disk includes rotating means for turning said disk to lock or unlock the medallion.

4. The method as defined in claim 3 wherein said rotating means include an opening and further providing a mating tool; and
   inserting said tool into said opening to turn said disk to lock or unlock the medallion 5. The method as defined in claim 1 including providing notches in said disk such that there is a notched area and an unnotched area wherein said notches allow said clips to be inserted through the opening; and
   rotating said disk to locate said unnotched area within the clips so that the clips are locked in an outward position abutting the surface of the wheel to prevent the clips from passing through the opening.

6. An anti-theft locking device for securing a medallion to the wheel of a vehicle wherein the medallion is of the type having a plurality of protruding spring retainers supplied with clips that are configured to pass through an opening at the hub of the wheel and abut a surface of the wheel opposite to the medallion body such that the medallion is held in place on the wheel, said device comprising:
   first and second engagement portions formed with said clips, said first engagement portion being outwardly bent with respect to said central axis of said hub opening and forming an outer engagement surface and said second engagement portion being inwardly bent with respect to said central axis of said hub opening and forming an inner engagement portion;
   a medallion locking disk dimensioned larger than the opening and having a plurality of blades, each of said blades having a rim, said disk configured to fit on the surface of the wheel opposite to the medallion and within the confines of the protruding spring retainers such that in the unlocked condition each of said blades extends between adjacent clips to allow said disk to be inserted into or removed from the retainers and when said disk is in the locked condition said blades are positioned with a rim of said blades located within the inner engagement portion of said second engagement portion of said clips to hold the outer engagement surface of said first engagement portion of said clips in an outward position abutting the surface of the wheel and to prevent the clips from passing through the opening so that the medallion is locked to the wheel.

7. The anti-theft locking device as defined in claim 6 including rotating means for turning said disk to lock or unlock the medallion.

8. The anti-theft locking device as defined in claim 7 wherein said rotating means include an opening in said disk that cooperates with a mating tool for rotating said disk.

9. The anti-theft locking device as defined in claim 7 wherein said rotating means include a nut located on said disk that cooperates with a mating tool for rotating said disk.

10. The anti-theft locking device as defined in claim 6 wherein said disk is plastic.

11. The anti-theft locking device as defined in claim 6 wherein said rim of said blade is beveled to mate with the clip.

12. The anti-theft locking device as defined in claim 6 including notches along the circumference of said disk such that there is a notched area and an unnotched area wherein said notched area will allow said clips to be inserted through the opening and when said disk is rotated to locate said unnotched area within the inner engagement portion of said clips, the clips are located in an outward position with their outer engagement surfaces abutting the surface of the wheel to prevent the clips from passing through the opening.

13. The anti-theft locking device as defined in claim 6 including inclined sides rising from said rim to a plateau such that when said locking device is in the locked condition said plateau extends through said opening into the medallion body and said rim of said blades is positioned within the clips.

14. The anti-theft locking device as defined in claim 13 including a shoulder located between said inclined sides and said rim such that said shoulder abuts the surface surrounding the opening.

15. The anti-theft locking device as defined in claim 6 wherein when said disk is in the locked condition said blades bias the spring retainers outward to prevent the retainers from passing through the opening.

16. The anti-theft locking device as defined in claim 15 wherein said rim includes an outwardly extending lock tab to bias the spring retainers outward.

* * * * *